(12) United States Patent
Livshiz et al.

(10) Patent No.: US 7,069,905 B1
(45) Date of Patent: Jul. 4, 2006

(54) METHOD OF OBTAINING DESIRED MANIFOLD PRESSURE FOR TORQUE BASED ENGINE CONTROL

(75) Inventors: Michael Livshiz, Ann Arbor, MI (US); Scott J. Chynoweth, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/208,435

(22) Filed: Aug. 19, 2005

Related U.S. Application Data

(60) Provisional application No. 60/698,630, filed on Jul. 12, 2005.

(51) Int. Cl.
*F02D 9/02* (2006.01)

(52) U.S. Cl. ........................ 123/361; 123/399

(58) Field of Classification Search ............... 123/361, 123/399
See application file for complete search history.

(56) References Cited

U.S. PATENT DOCUMENTS

| | | | |
|---|---|---|---|
| 6,704,638 B1 | 3/2004 | Livshiz et al. | |
| 6,761,146 B1 | 7/2004 | Livshiz et al. | |
| 6,966,287 B1* | 11/2005 | Livshiz et al. | 123/399 |
| 2005/0056251 A1 | 3/2005 | Stroh et al. | |
| 2005/0076887 A1* | 4/2005 | Surnilla et al. | 123/481 |

* cited by examiner

*Primary Examiner*—Erick Solis
(74) *Attorney, Agent, or Firm*—Christopher DeVries

(57) ABSTRACT

A torque control system for an engine includes a first module that estimates a first engine torque based on an air-per-cylinder (APC) value and a second module that estimates a second engine torque based on a manifold absolute pressure (MAP). A third module determines a desired MAP based on the first engine torque and the second engine torque. A throttle opening is regulated based on the desired MAP.

23 Claims, 4 Drawing Sheets

METHOD OF OBTAINING DESIRED MANIFOLD PRESSURE FOR TORQUE BASED ENGINE CONTROL

CROSS-REFERENCE TO RELATED APPLICATIONS

This application claims the benefit of U.S. Provisional Application No. 60/698,630, filed on Jul. 12, 2005. The disclosure of the above application is incorporated herein by reference.

FIELD OF THE INVENTION

The present invention relates to engine torque control, and more particularly to determining a desired manifold pressure for regulating engine torque output.

BACKGROUND OF THE INVENTION

Internal combustion engine control systems have been developed as steady-state, torque-based control systems. In a torque-based control system, the desired torque output of the engine is indicated by a driver input. More specifically, a driver adjusts a position of an accelerator pedal, which provides an engine torque request. The throttle is controlled to regulate air flow into the engine that provides the desired engine torque output.

Torque-based control systems determine the mass of air needed to produce the desired engine torque and determine throttle position, exhaust gas recirculation (EGR) valve position and cam phase angles based on the mass of air. Traditionally, the throttle position is commanded directly as a function of the accelerator pedal position. Commonly assigned U.S. Patent Publication No. 2005/0056251, filed on Sep. 17, 2003 and entitled Dynamic Torque Control System describes a method which uses the manifold filling dynamics and can initially command the throttle to a value greater than the steady-state value. As the manifold fills with air the, throttle is brought back to the steady-state position. This results in a more aggressive partial throttle acceleration, but may lead to an unexpected feel of the vehicle to the driver by not producing the expected behavior of the throttle to a step-in change in the accelerator pedal.

SUMMARY OF THE INVENTION

Accordingly, the present invention provides a torque control system for an engine. The torque control system includes a first module that estimates a first engine torque based on an air-per-cylinder (APC) value and a second module that estimates a second engine torque based on a manifold absolute pressure (MAP). A third module determines a desired MAP based on the first engine torque and the second engine torque. A throttle opening is regulated based on the desired MAP.

In other features, the torque control system further includes a fourth module that determines a torque difference based on the first engine torque and the second engine torque. The desired MAP is determined based on the torque difference. A filter module filters the torque difference. The desired MAP is determined based on the filtered difference.

In other features, the torque control system further includes a third module that determines a reference torque. The desired MAP is determined further based on the reference torque. A fourth module determines a torque error based on the reference torque and the first engine torque. A fifth module determines a torque control factor based on the torque error. The desired MAP is determined based on the torque control factor.

In still another feature, the third module determines the desired MAP based on a sum torque that is based on a total reference torque and a torque difference, which are determined based on the first engine torque and the second engine torque.

In yet another feature, the third module determines the desired MAP using in inverted torque model.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
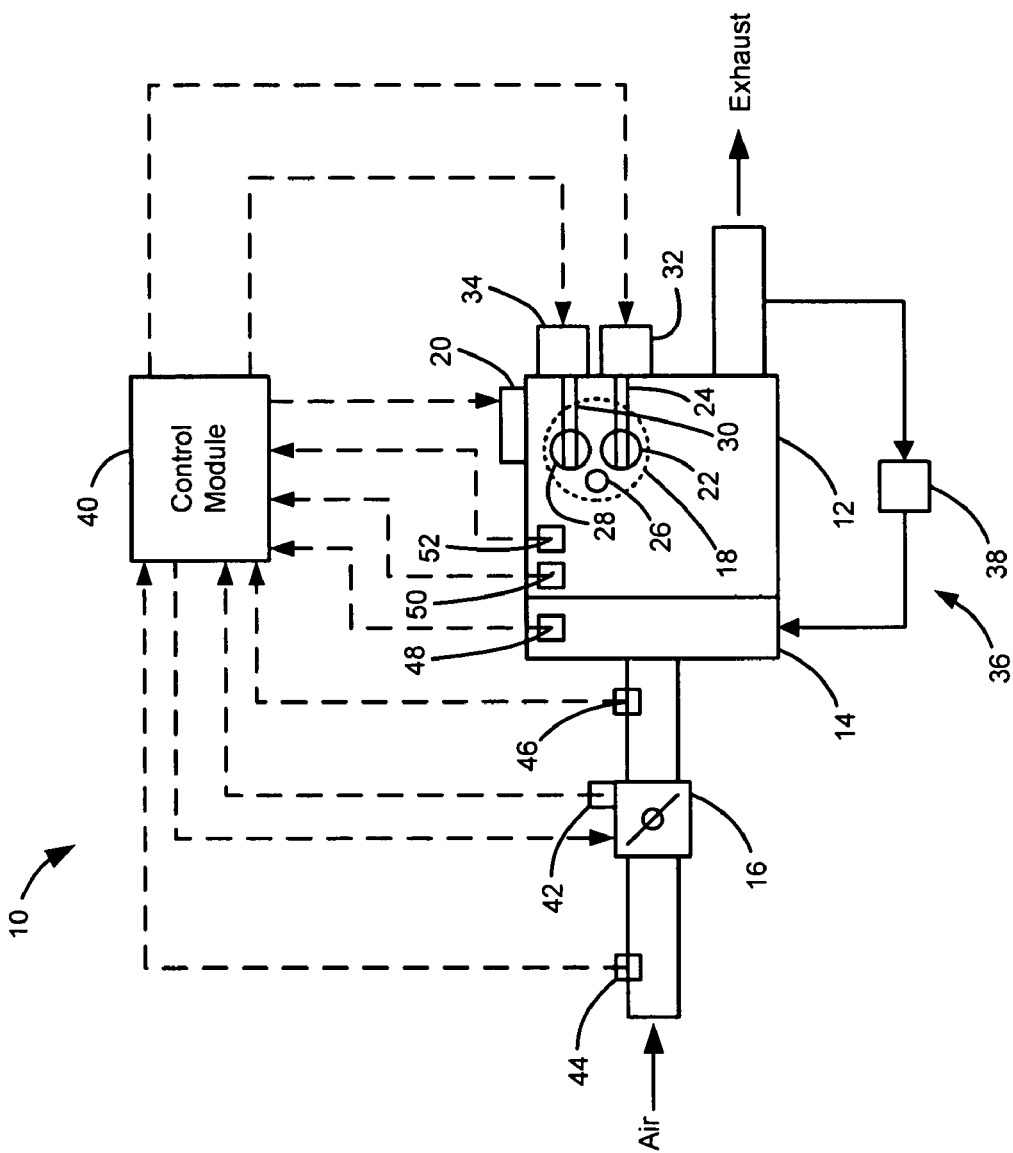
FIG. 1 is a functional block diagram of an exemplary engine system that is operated based on the engine torque control system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, it is appreciated that the engine torque control system of the present invention can be implemented in engines having a plurality of cylinders including, but not limited to, 2, 3, 4, 5, 6, 8, 10 and 12 cylinders.

A fuel injector (not shown) injects fuel which is combined with the air as it is drawn into the cylinder 18 through an intake port. The fuel injector may be an injector associated with an electronic or mechanical fuel injection system 20, a jet or port of a carburetor or another system for mixing fuel with intake air. The fuel injector is controlled to provide a desired air-to-fuel (A/F) ratio within each cylinder 18.

An intake valve 22 selectively opens and closes to enable the air/fuel mixture to enter the cylinder 18. The intake valve position is regulated by an intake cam shaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out an exhaust port when an exhaust valve 28 is in an open position. The exhaust valve position is regulated by an exhaust cam shaft 30. The exhaust is treated in an exhaust system and is released to atmosphere. Although single intake and exhaust valves 22,28 are illustrated, it is appreciated that the engine 12 can include multiple intake and exhaust valves 22,28 per cylinder 18.

The engine system 10 can include an intake cam phaser 32 and an exhaust cam phaser 34 that respectively regulate the rotational timing of the intake and exhaust cam shafts 24,30. More specifically, the timing or phase angle of the respective intake and exhaust cam shafts 24,30 can be retarded or advanced with respect to each other or with respect to a location of the piston within the cylinder 18 or crankshaft position. In this manner, the position of the intake and exhaust valves 22,28 can be regulated with respect to each other or with respect to a location of the piston within the cylinder 18. By regulating the position of the intake valve 22 and the exhaust valve 28, the quantity of air/fuel mixture ingested into the cylinder 18 and therefore the engine torque is regulated.

The engine system 10 can also include an exhaust gas recirculation (EGR) system 36. The EGR system 36 includes an EGR valve 38 that regulates an exhaust flow back into the intake manifold 14. The EGR system is generally implemented to regulate emissions. However, the mass of exhaust air that is re-circulated back into the intake manifold 14 affects engine torque output.

A control module 40 operates the engine based on the engine torque control of the present invention. More specifically, the control module 40 generates a throttle control signal based on an engine torque request ($T_{REQ}$) and a throttle position signal generated by a throttle position sensor (TPS) 42. $T_{REQ}$ is generated based on a driver input such as an accelerator pedal position. The control module commands the throttle to a steady-state position to achieve an effective throttle area ($A_{eff}$). A throttle actuator (not shown) adjusts the throttle position based on the throttle control signal. The throttle actuator can include a motor or a stepper motor, which provides limited and/or coarse control of the throttle position. The control module 40 also regulates the fuel injection system 20, the cam shaft phasers 32,34 and the EGR system 36 to achieve $T_{REQ}$.

An intake air temperature (IAT) sensor 44 is responsive to a temperature of the intake air flow and generates an intake air temperature signal. A mass airflow (MAF) sensor 46 is responsive to the mass of the intake air flow and generates a MAF signal. A manifold absolute pressure (MAP) sensor 48 is responsive to the pressure within the intake manifold 14 and generates a MAP signal. An engine coolant temperature sensor 50 is responsive to a coolant temperature and generates an engine temperature signal. An engine speed sensor 52 is responsive to a rotational speed of the engine 12 and generates in an engine speed signal. Each of the signals generated by the sensors are received by the control module 40.

The engine torque control system of the present invention determines $A_{eff}$ based on a desired MAP ($MAP_{DES}$). More specifically, MAPDES is determined based on an air-per-cylinder (APC) based torque ($T_{APC}$) and a MAP-based torque ($T_{MAP}$). $T_{APC}$ is determined based on various engine operating parameters including, but not limited to, air-to-fuel (A/F) ratio, oil temperature, spark timing, MAF and efficiency values. An exemplary method of calculating $T_{APC}$ is disclosed in commonly assigned U.S. Pat. No. 6,704,638, issued on Mar. 9, 2004 and entitled Torque Estimator for Engine RPM and Torque Control. $T_{MAP}$ is determined based on the following relationship:

$$T_{MAP} = \eta_{af} * \eta_{\#}(T_{REF} + T_{fr}) - T_{fr} - T_{cold} - T_{acc} \quad (1)$$

where $\eta_{af}$ is the efficiency of the engine relative to A/F ratio change, $\eta_{\#}$ is the torque efficiency to number of cylinders, $T_{fr}$ is a torque load resulting from friction, $T_{cold}$ is determined based on engine RPM and oil temperature, and $T_{acc}$ is a torque load resulting from accessories that are driven by the engine (e.g., alternator, pumps). $T_{REF}$ is a reference torque that is determined according to the following relationship:

$$T_{REF} = a_p MAP + a_{off} + a_s * S + a_s^2 * S^2 + a_{MAP*S} MAP*S + a_{MAP*S^2} MAP*S^2 \quad (2)$$

where S is the spark advance, and the a coefficients are constants that are determined based on various engine operating parameters as discussed in detail in U.S. Pat. No. 6,704,638.

The engine torque control determines a torque control error ($T_{ERR}$) as the difference between $T_{REF}$ and $T_{APC}$. A torque control value (TC) is determined by processing $T_{ERR}$ using a proportional-integral-derivative (PID) operation. More specifically, TC is determined according to the following equation:

$$TC = k_1 * T_{ERR} + k_2 * \text{Derivative}(T_{ERR}) + k_3 * \text{Integral}(T_{ERR}) \quad (3)$$

where $k_1$, $k_2$ and $k_3$ are calibratable constants.

A total reference torque ($T_{REFTOTAL}$) is calculated as the sum of $T_{REF}$ and TC. A torque difference ($\Delta T$) is calculated as the difference between $T_{APC}$ and $T_{MAP}$. $\Delta T$ is filtered using a low-pass filter to eliminate any signal noise and to provide a filtered $\Delta T$ ($\Delta T_{FILT}$). The engine torque control calculates a torque sum ($T_{SUM}$) as the sum of $T_{REFTOTAL}$ and $\Delta T_{FILT}$. $MAP_{DES}$ is determined using an inverse torque model based on engine operating parameters including, but not limited to, RPM, intake valve angle ($\phi_I$), exhaust valve angle ($\phi_E$), spark advance, A/F ratio, oil temperature and a barometric correction factor (BARO). An exemplary inverted torque model is described in commonly assigned U.S. Pat. No. 6,761,146, issued on Jul. 13, 2004 and entitled Model Following Torque Control, the disclosure of which is expressly incorporated herein by reference.

Having determined $MAP_{DES}$ as described above, the engine torque control system determines $A_{eff}$ according to the following equation:

$$A_{eff} = \frac{\dot{m}_{th} \sqrt{RT_{amb}}}{\Phi} \quad (4)$$

where $\Phi$ is based on a pressure ratio ($P_R$) according to the following relationships:

$$\Phi = \begin{cases} \sqrt{\dfrac{2\gamma}{\gamma-1}\left(1-P_R^{\frac{\gamma-1}{\gamma}}\right)} & \text{if } P_R > P_{critical} = \left(\dfrac{2}{\gamma+1}\right)^{\frac{\gamma}{\gamma-1}} = 0.528 \\ \sqrt{\gamma\dfrac{2}{\gamma+1}^{\frac{\gamma+1}{(\gamma-1)}}} & \text{if } P_R \leq P_{critical} \end{cases} \quad (5)$$

where $P_R$ is the ratio of $MAP_{DES}$ to the ambient pressure ($P_{amb}$) and $P_{critical}$. $P_{critical}$ is defined as the pressure ratio at which the velocity of the air flowing past the throttle equals the velocity of sound. This condition is called choked or critical flow. The critical pressure ratio is determined by:

$$P_{CR} = \left(\dfrac{2}{\gamma+1}\right)^{\gamma/\gamma-1}$$

where $\gamma$ is the ratio of specific heats for air and range from about 1.3 to about 1.4.

The engine torque control system determines the value of $MAP_{DES}$ to produce the desired airflow through the throttle. The airflow enables the correct amount of air to enter the cylinders to provide $T_{REQ}$ from the engine. Because the control module commands the throttle to a steady-state position, it can be assumed that $m_{th}$ is equal to $m_a$. More specifically, during steady-state the flow across the throttle ($m_{th}$) is equal to the flow into the cylinders (out of the manifold) ($m_a$) Since $A_{eff}$ and $MAP_{DES}$ are set-point targets and time is required to reach these values (e.g., approximately 100 ms), it can be approximated that $m_{th}$ is equal to $m_a$.

Figure 2:
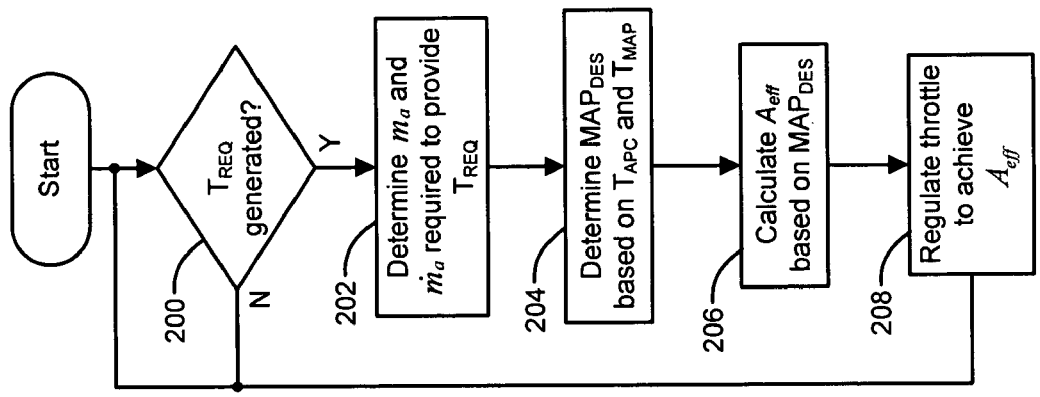
FIG. 2 is a flowchart illustrating steps performed by the engine torque control system of the present invention.

Referring now to FIG. 2, exemplary steps performed by the engine torque control system will be described in detail. In step 200, control determines whether $T_{REQ}$ has been generated. If $T_{REQ}$ has not been generated, control loops back. If $T_{REQ}$ has been generated, control determines $m_a$ and $m_a$ required to achieve $T_{REQ}$ in step 202. In step 204, control determines $MAP_{DES}$ based on $m_a$. In step 206, control determines $A_{eff}$ based on $MAP_{DES}$. Control regulates the throttle to achieve $A_{eff}$ in step 208 and loops back to step 200.

Figure 3:
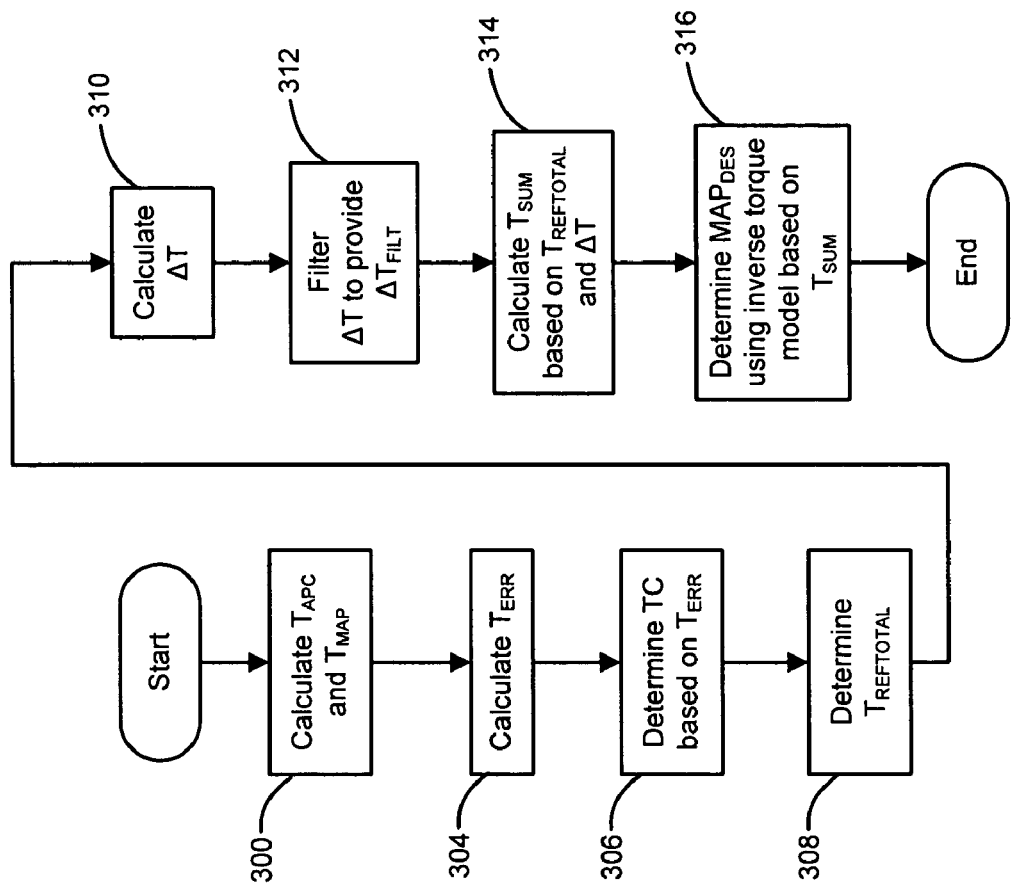
FIG. 3 is a flowchart illustrating exemplary steps executed by the engine torque control for determining a desired manifold absolute pressure (MAP) based on an air-per-cylinder (APC) based torque estimate and a MAP torque estimate.

Referring now to FIG. 3, exemplary steps for determining $MAP_{DES}$ will be discussed in detail. In step 300, control calculates $T_{APC}$ and $T_{MAP}$. In step 304, control calculates $T_{ERR}$ based on $T_{REF}$ and $T_{APC}$. Control determines TC based on $T_{ERR}$ in step 306. In step 308, control determines $T_{REFTOTAL}$. In step 310, control calculates $\Delta T$ and control filters $\Delta T$ in step 312 to provide $\Delta T_{FILT}$. In step 314, calculates $T_{SUM}$ based on $T_{REFTOTAL}$ and $\Delta T$. Control processes $T_{SUM}$ and other engine operating parameters through the inverse torque model to determine $MAP_{DES}$ in step 316 and control ends.

Figure 4:
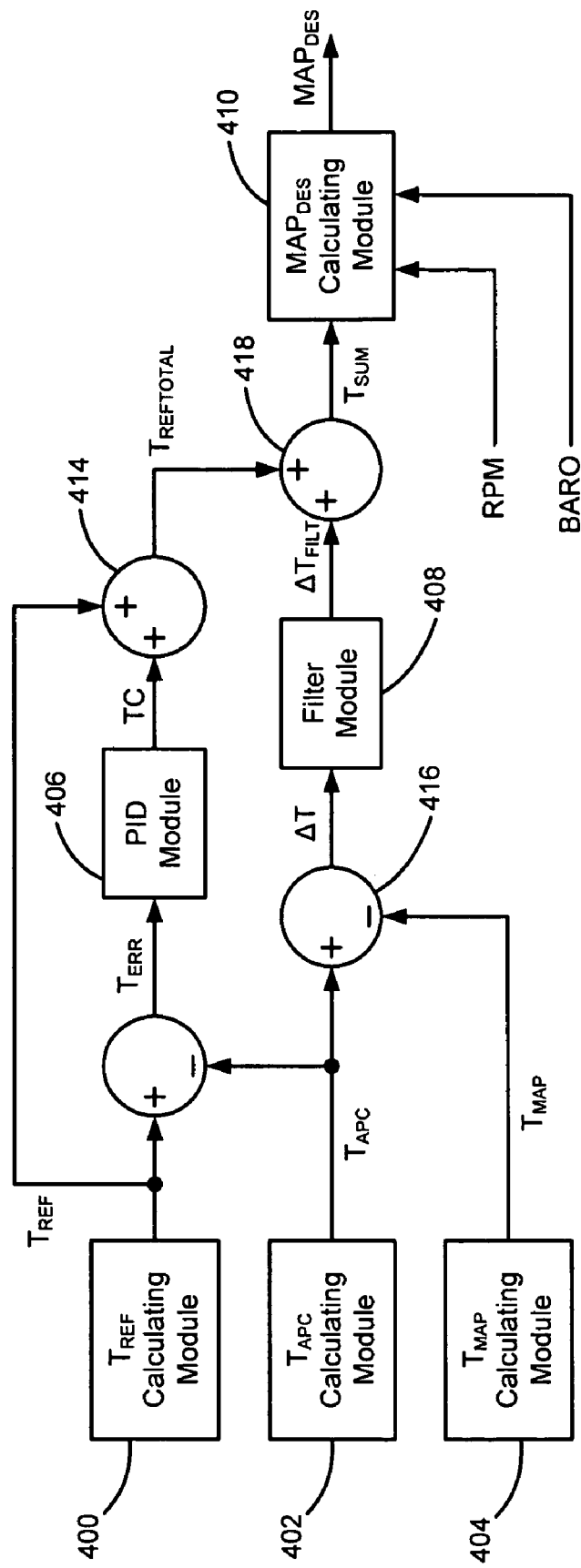
FIG. 4 is a functional block diagram of exemplary modules that execute the engine torque control of the present invention.

Referring now to FIG. 4, exemplary modules that execute the engine torque control of the present invention will be described in detail. The exemplary modules include a $T_{REF}$ calculating module 400, a $T_{APC}$ calculating module 402, a $T_{MAP}$ calculating module 404, a PID module 406, a filter module 408 and a $MAP_{DES}$ calculating module 410. The $T_{REF}$ calculating module 400 calculates $T_{REF}$ based on equation (2), described in detail above. The $T_{APC}$ calculating module 402 calculates $T_{APC}$ as described in detail above and the $T_{MAP}$ calculating module 404 calculates $T_{MAP}$ based on equation (1), described in detail above.

$T_{REF}$ is output to a first summer 412 and a second summer 414. TAPC is output to the first summer 412 and a third summer 414. The first summer 412 inverts $T_{APC}$ and determines $T_{ERR}$ as the difference between $T_{REF}$ and $T_{APC}$. $T_{ERR}$ is output to the PID module 406, which processes $T_{ERR}$ to provide TC. TC is output to the second summer 414, which sums $T_{REF}$ and TC to provide $T_{REFTOTAL}$. $T_{REFTOTAL}$ is output to a fourth summer 418. The third summer 416 inverts $T_{MAP}$ and determines $\Delta T$ as the difference between $T_{APC}$ and $T_{MAP}$. $\Delta T$ is output to the filter module 408, which outputs $\Delta T_{FILT}$ to the fourth summer 418. The fourth summer 418 determines $T_{SUM}$ as the sum of $T_{REFTOTAL}$ and $\Delta T_{FILT}$. $T_{SUM}$ is output to the $MAP_{DES}$ calculating module, which determines $MAP_{DES}$ based on the inverted torque model and various engine operating parameters including, but not limited to, engine RPM and a barometric correction factor (BARO). A throttle control module (not shown) determines $A_{eff}$ based on $MAP_{DES}$ and regulates the throttle opening based on $A_{eff}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A torque control system for an engine, comprising:
   a first module that estimates a first engine torque based on an air-per-cylinder (APC) value;
   a second module that estimates a second engine torque based on a manifold absolute pressure (MAP); and
   a third module that determines a desired MAP based on said first engine torque and said second engine torque, wherein a throttle opening is regulated based on said desired MAP.

2. The torque control system of claim 1 further comprising a fourth module that determines a torque difference based on said first engine torque and said second engine torque, wherein said desired MAP is determined based on said torque difference.

3. The torque control system of claim 2 further comprising a filter module that filters said torque difference, wherein said desired MAP is determined based on said filtered difference.

4. The torque control system of claim 1, further comprising a third module that determines a reference torque, wherein said desired MAP is determined further based on said reference torque.

5. The torque control system of claim 4 further comprising a fourth module that determines a torque error based on said reference torque and said first engine torque.

6. The torque control system of claim 5 further comprising a fifth module that determines a torque control factor based on said torque error, wherein said desired MAP is determined based on said torque control factor.

7. The torque control system of claim 1 wherein said third module determines said desired MAP based on a sum torque that is based on a total reference torque and a torque difference, which are determined based on said first engine torque and said second engine torque.

8. The torque control system of claim 1 wherein said third module determines said desired MAP using in inverted torque model.

9. A method of controlling a torque output an engine, comprising:
   estimating a first engine torque based on an air-per-cylinder (APC) value;
   estimating a second engine torque based on a manifold absolute pressure (MAP); and
   determining a desired MAP based on said first engine torque and said second engine torque, wherein a throttle opening is regulated based on said desired MAP.

10. The method of claim 9 further comprising determining a torque difference based on said first engine torque and said second engine torque, wherein said desired MAP is determined based on said torque difference.

11. The method of claim 10 further comprising filtering said torque difference, wherein said desired MAP is determined based on said filtered torque difference.

12. The method of claim 9, further comprising determining a reference torque, wherein said desired MAP is determined further based on said reference torque.

13. The method of claim 12 further comprising determining a torque error based on said reference torque and said first engine torque.

14. The method of claim 13 further comprising determining a torque control factor based on said torque error, wherein said desired MAP is determined based on said torque control factor.

15. The method of claim 9 wherein said desired MAP is determined based on a sum torque that is based on a total reference torque and a torque difference, which are determined based on said first engine torque and said second engine torque.

16. The method of claim 9 wherein said desired MAP is determined using in inverted torque model.

17. A method of regulating air flow into and engine to control a torque output of the engine, comprising:
   estimating a first engine torque based on an air-per-cylinder (APC) value;
   calculating a reference torque;
   estimating a second engine torque based on a manifold absolute pressure (MAP) said reference torque and at least one engine load torque; and
   determining a desired MAP based on said first engine torque and said second engine torque, wherein a throttle opening is regulated based on said desired MAP.

18. The method of claim 17 further comprising determining a torque difference based on said first engine torque and said second engine torque, wherein said desired MAP is determined based on said torque difference.

19. The method of claim 18 further comprising filtering said torque difference, wherein said desired MAP is determined based on said filtered torque difference.

20. The method of claim 17 further comprising determining a torque error based on said reference torque and said first engine torque.

21. The method of claim 20 further comprising determining a torque control factor based on said torque error, wherein said desired MAP is determined based on said torque control factor.

22. The method of claim 17 wherein said desired MAP is determined based on a sum torque that is based on a total reference torque and a torque difference, which are determined based on said first engine torque and said second engine torque.

23. The method of claim 17 wherein said desired MAP is determined using in inverted torque model.

* * * * *